US006782170B2

(12) United States Patent
Stayt, Jr. et al.

(10) Patent No.: US 6,782,170 B2
(45) Date of Patent: Aug. 24, 2004

(54) OPTICAL DEVICE HAVING A REFERENCE MARK SYSTEM

(75) Inventors: John W. Stayt, Jr., Schnecksville, PA (US); Frank S. Walters, Kutztown, PA (US)

(73) Assignee: TriQuint Technology Holding Co., Porland, OR (US)

( * ) Notice: Subject to any disclaimer, the term of this patent is extended or adjusted under 35 U.S.C. 154(b) by 0 days.

(21) Appl. No.: 09/755,406

(22) Filed: Jan. 5, 2001

(65) Prior Publication Data

US 2003/0147594 A1 Aug. 7, 2003

(51) Int. Cl.$^7$ .............................. G02B 6/26; G02B 6/42
(52) U.S. Cl. ..................................................... 385/52
(58) Field of Search ........................... 385/52, 90, 93; 356/399, 400, 401

(56) References Cited

U.S. PATENT DOCUMENTS

| | | | | |
|---|---|---|---|---|
| 4,457,467 A | * | 7/1984 | Klement et al. | 228/103 |
| 4,616,899 A | * | 10/1986 | Schlafer | 385/93 |
| 4,865,455 A | * | 9/1989 | Kohno et al. | 356/400 |
| 5,011,247 A | * | 4/1991 | Boudreau et al. | 385/88 |
| 6,313,916 B1 | * | 11/2001 | Inada | 356/399 |

* cited by examiner

*Primary Examiner*—Lynn Feild
*Assistant Examiner*—Brian S. Webb

(57) ABSTRACT

An optical device, a method of manufacture thereof, and a system for manufacturing the optical device. The optical device, in an exemplary embodiment, includes an optical component and a reference mark system located on an outer surface of the optical component. The reference mark system provides information regarding a location of an optical path of the optical component.

18 Claims, 4 Drawing Sheets

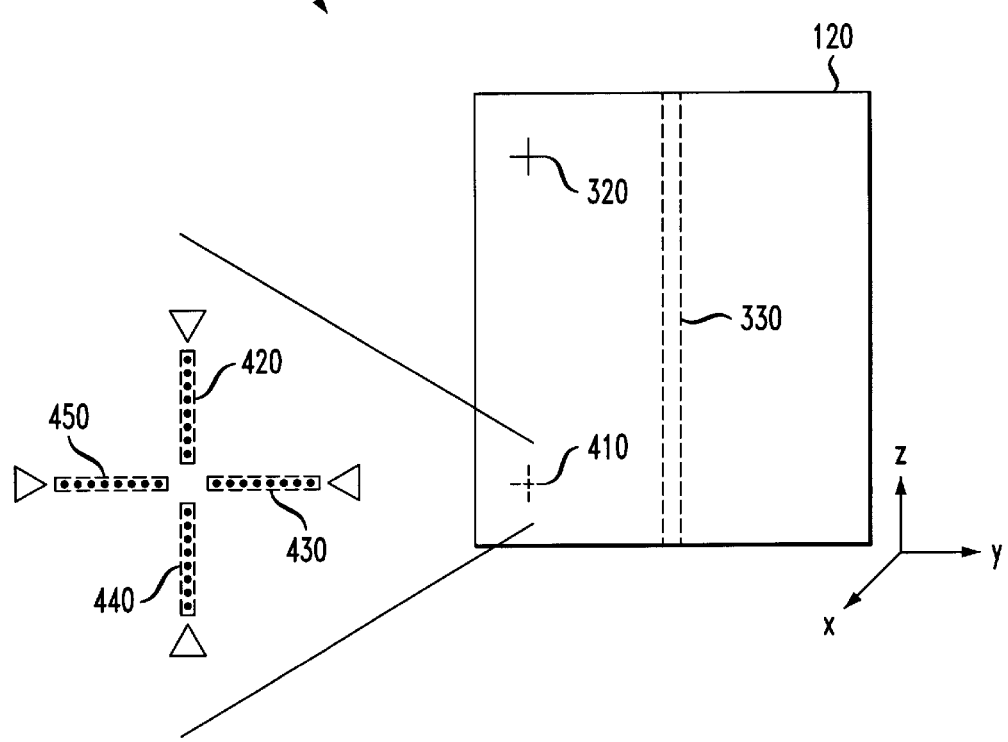

OPTICAL DEVICE HAVING A REFERENCE MARK SYSTEM

TECHNICAL FIELD OF THE INVENTION

The present invention is directed, in general, to an optical device and, more specifically, to an optical device including an optical component having a reference mark system located thereon, a method of manufacture therefor, and a system for manufacturing thereof.

BACKGROUND OF THE INVENTION

Optical devices continue to increase in importance in today's technology sectors. Traditional optical devices may include components such as lasers, optical fibers, splitters, detectors, and many other components, wherein the lasers are optically coupled to the other components. Generally, it is very important to accurately couple the output laser beam of the laser to the input facet of the other receiving component. Without an accurate coupling of the output laser beam to the receiving component, the optical devices may experience losses or reflections and will not function as desired.

Currently, the optoelectronics industry uses two methods to attempt to accurately couple lasers to other commonly used components. The first method is a passive alignment method. The passive alignment method is based on approximating the location of an active stripe of the laser, thus approximating the location of the exiting laser beam, based on different facets located in the laser. In a typical situation, the location of the active stripe is assumed with respect to the two side wall edges and the front facet of the laser. A problem with the passive alignment method is that the laser beam experiences poor coupling repeatability because one cannot consistently determine exactly where the active stripe output is in relation to the cleaved edges of the laser.

The second method currently used to attempt to accurately couple lasers to other commonly used components, is an active alignment method. The active alignment method generally required placing the laser adjacent the desired optical element. After placing the laser adjacent the desired optical element, a current may be applied to the laser, causing the laser to generate the laser beam. While the laser beam is emanating from a surface of the laser, either the laser itself, or the optical element, is moved to achieve optimum coupling. After an accurate coupling is achieved, either the laser, the optical element, or both, is securably fixed. The problem with the active alignment method is that it is slow because a current must be applied to the laser, while either the laser itself, or the optical element located adjacent it, must be moved before fixing one or both in place.

Accordingly, what is needed in the art is a laser that allows for high speed coupling between the laser and an adjacent optical element, as required by today's competitive market. Moreover, what is further needed in the art is a laser that may be easily and accurately coupled to an adjacent optical element without experiencing the repeatability problems associated with the prior art.

SUMMARY OF THE INVENTION

To address the above-discussed deficiencies of the prior art, the present invention provides an optical device, a method of manufacture thereof, and a system for manufacturing the optical device. The optical device, in an exemplary embodiment, includes an optical component and a reference mark system located on an outer surface of the optical component. The reference mark system provides information regarding a location of an optical path of the optical component.

Thus, in one aspect, the present invention provides an optical device that allows for automated assembly in an optical package without having to power the optical component during mounting. Moreover, the automated assembly may be accomplished quickly, thereby reducing the time and expense associated within the prior art devices. Also of benefit, the optical device allows important information to be encoded into the reference mark system, such as coupling distance, a thickness of the optical component, power asymmetry, or a length of the optical component.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The invention is best understood from the following detailed description when read with the accompanying FIGUREs. It is emphasized that in accordance with the standard practice in the optoelectronic industry, various features may not be drawn to scale. In fact, the dimensions of the various features may be arbitrarily increased or reduced for clarity of discussion. Reference is now made to the following descriptions taken in conjunction with the accompanying drawings, in which:

FIG. 4 illustrates another embodiment of a reference mark system, wherein at least one reference mark in the reference mark system includes a series of bits formed therein, representing a bit pattern.

DETAILED DESCRIPTION

Figure 1:
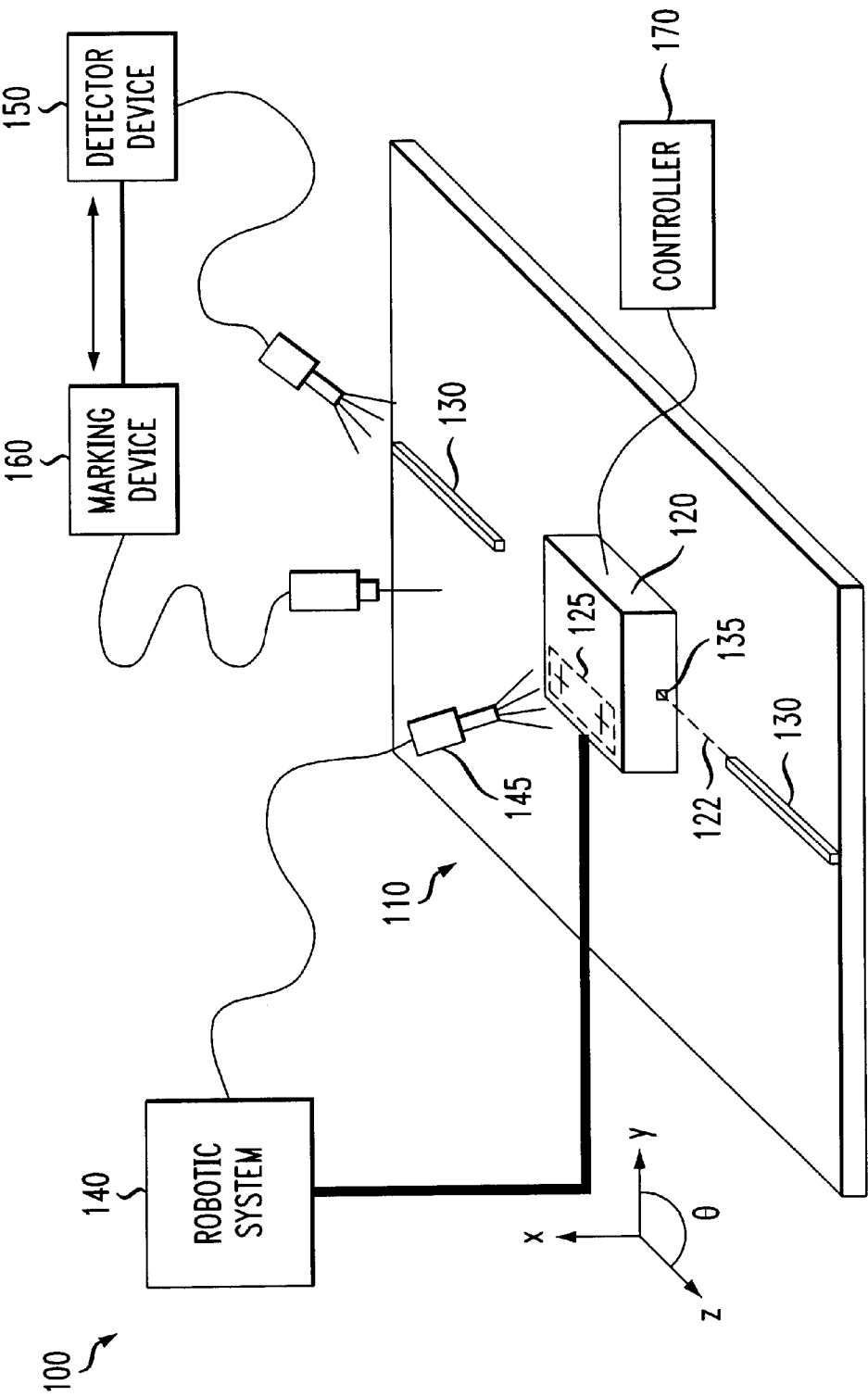
FIG. 1 illustrates one embodiment of a system for manufacturing an optical device, which forms the basis for the present invention.

Referring initially to FIG. 1, illustrated is one embodiment of a system 100 for manufacturing an optical device 110, in accordance with the present invention. In the embodiment illustrated in FIG. 1, the system 100 includes the optical device 110, including an optical component 120, and an optical element 130 couplable to an optical path 122 of the optical component 120. The type of optical component 120 may vary. For example, the optical component 120 may include devices such as a laser chip, photodetectors, modulators, or other similar components. The optical element 130, in an exemplary embodiment, may be an optical fiber, a lens, an etalon, a filter, a detector or other similar component.

Located on an outer surface of the optical component 120 is a reference mark system 125, which provides information regarding a point of emergence of the laser beam from the optical component 120. The term "on an outer surface of the optical component" is meant to include the actual outer surface of the optical component 120 or any subterranean surface on which the reference mark system 125 may still be observed, such as a surface located under a transparent or semi-transparent layer. While the point of emergence may be coincidental with an end of an optical path, such as a laser stripe 135 of the optical component 120, it need not be coincidental to be within the scope of the present invention. In an exemplary embodiment of the invention, the optical component 120 is an epitaxially grown multi quantum well dual output laser chip. It should be noted, however, that the optical component 120 may comprise any known or hereafter discovered optical component that produces a laser beam that is desired to be optically coupled to another optical element.

The system 100 illustrated in FIG. 1 may further include a robotic system 140, which may be capable of interpreting the reference mark system 125 and precisely positioning the optical component 120 and the optical element with respect to one another. The robotic system 140 may be largely conventional in design. However, in one embodiment the robotic system 140 includes a vision is system 145 configured to interpret the reference mark system 125. As illustrated in FIG. 1, the robotic system may precisely alter the location of the optical component 120, or optical element 130, in the X, Y, Z and θ directions. In the illustrative embodiment of FIG. 1, the robotic system 140 positions the optical component 120 with respect to the optical elements 130. It should be noted, however, that the robotic system 140 may also use the reference mark system 125 to position the optical elements 130 with respect to the optical component 120. The net result is the same, wherein the optical component 120, and more importantly a laser beam from the optical component 120, is accurately aligned with the optical elements 130. While positioning of the optical component 120 with respect to the optical element 130 has been described above using the robotic system 140, in an alternative embodiment, the positioning could also be accomplished manually using a microscope.

The robotic system 140 may include a computer subsystem (not shown) that may be configured to receive and process information from the robotic system 140. In one embodiment of the present invention, the computer subsystem may be software residing on a conventional personal computer. The software embodiment includes source code, object code, libraries, executable programs and other software structures that cooperatively function together to achieve the functionality of the present invention. The computer subsystem may also include a monitor, a chassis or a keyboard. Alternatively, however, the monitor and the keyboard may be replaced by other conventional output and input devices, respectively.

It should be noted that any conventional computer system having at least one CPU is suitable to function as the computer subsystem, including without limitation, hand-held units, laptop/notebooks, minis, mainframes and supercomputers, including RISC and parallel processing architectures, as well as combinations of such systems. Conventional computer system architecture is more fully discussed in *Computer Organization and Architecture*, by William Stallings, MacMillan Publishing Co. (3rd ed. 1993), which is also incorporated herein by reference. Alternative computer system embodiments may be firm-or hardware-based. It should also be noted that the computer system is not limited to an external source and may be included within a logic provided in the robotic system 140.

The system 100 may further include at least one detector device 150 for detecting a far field coupling point of the laser emanating from the optical component 120, thickness of the optical component 120, power asymmetry of the optical component 120, or length of the optical component 120. The detector device 150 may be a sweeping detector, a camera, a power meter, or any other device capable of detecting the above-mentioned properties of the optical component 120. In an exemplary embodiment where the optical component 120 is a dual output laser chip, two detector devices 150 could be placed to detect the far field coupling point of both laser beams exiting the optical component 120. A more detailed discussion of the detector devices 150 and the far field coupling point is made below.

The system may also include a marking system 160 designed to mark the reference mark system 125 on the surface of the optical component 120. In an exemplary embodiment of the invention, the marking system 160 is a laser, such as a krypton laser, that etches the reference mark system into the outer surface of the optical component 120. In an exemplary embodiment, the marking system 160 will be coupled to the detector device 150 to mark the reference mark system 125 on the optical component 120 with respect to the information detected by the detector device 150. It should further be noted that the system 100 may further include a controller 170 for applying a current to the optical component 120 to activate the laser beam, such that the far field coupling point may be detected using the detector device 150. Even though the detector device 150, marking system 160, and controller 170 are shown and may be included in the system 100, in an exemplary embodiment of the invention, such devices would not be included in the system 100 and would be in a separate system, e.g., a test and measurement system, wherein they could examine the optical component 120 independent of the remainder of the optical device 110.

Figure 2:
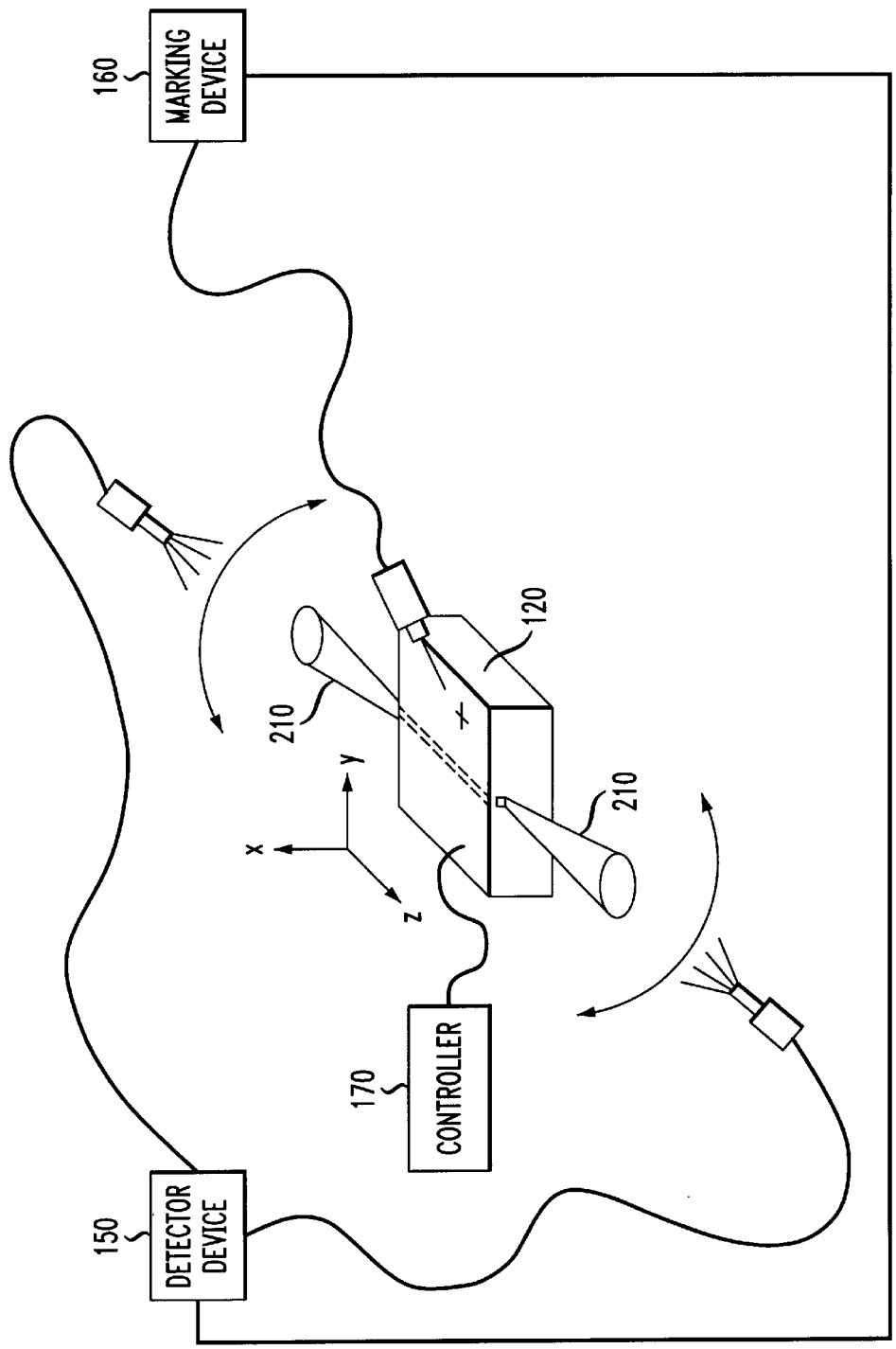
FIG. 2 illustrates the optical component discussed in FIG. 1 during determination of a far field coupling point of a laser beam.

Turning to FIG. 2, with continued reference to FIG. 1, illustrated is the optical component 120 illustrated in FIG. 1 during determination of a far field coupling point of a laser beam 210. As shown, the optical component 120 is being examined independent the remainder of the optical device 110. To determine the far field coupling point, a current should be applied to the optical component 120. In an exemplary embodiment, the controller 170 may be used to apply the current to the optical component 120. After applying the current to the optical component 120, the detector device 150 may locate the far field coupling point. If the optical component 120 is a dual output laser chip, the far field coupling point for both laser beams 210 exiting the optical component 120, may be determined. In the illustrative embodiment shown in FIG. 2, the far field coupling point is being determined in the y-direction. It should be noted, however, that in an exemplary embodiment of the present invention, the far field coupling point may also be determined in the x-direction by scanning in such a direction.

In an alternative embodiment, the detector device 150 may also determine other properties of the optical component 120 and laser beam 210. Properties, such as degree of rotation between a front face of the optical component 120 and the exiting laser beam 210, power asymmetry of the laser beam 210, thickness (x-direction) of the optical component 120 and length (z-direction) of the optical component 120, may also be determined. The power asymmetry represents the variation in front to rear facet power. Knowing the power asymmetry for a optical component 120 may be extremely beneficial when coupling the optical component 120 to an optical element such as a PIN detector. This is because placement of the PIN detector is determined by tuning or detuning to enhance or decrease power to the PIN detector as needed to optimize an optical signal. Laser beam 210 offset or deflection from a surface normal, may be analyzed and encoded. These offsets may be caused by index changes within the waveguide or runout of crystal planes relative to the cleavage planes.

After determining the degree of rotation between a front face of the optical component 120 and the exiting laser beam 210, power asymmetry of the laser beam 210, thickness (x-direction) of the optical component 120, and length (z-direction) of the optical component 120, the marking system 160, which may be coupled to the detector device 150, may form the reference mark system 125 on the outer surface of the optical component 120. In an alternative embodiment of the present invention, the marking system 160 may form the reference mark system 125 on a bottom outer surface of the optical component 120, or in an alternative embodiment, both surfaces thereof.

Figure 3:
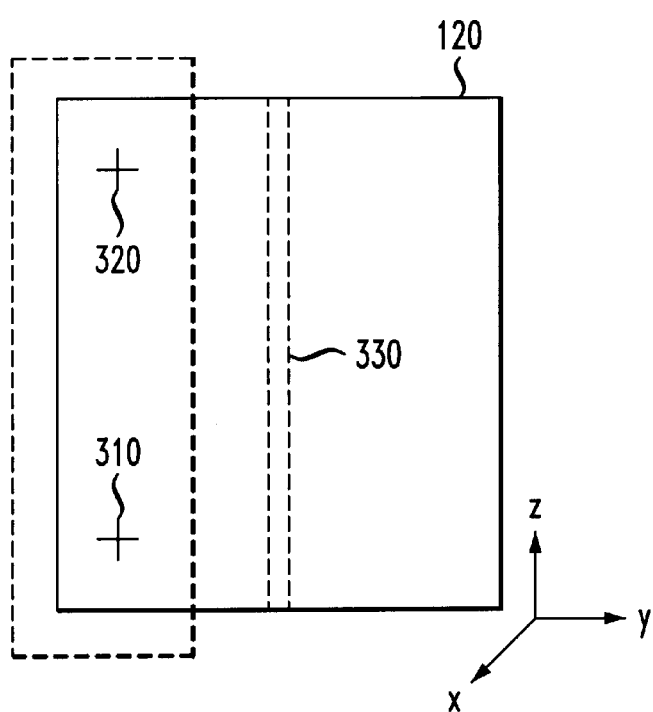
FIG. 3 illustrates one embodiment of a reference mark system, wherein at least two reference marks are placed on the outer surface of the optical component.

Turning to FIGS. 3 and 4, with continued reference to FIGS. 1 and 2, illustrated are various embodiments of the reference mark system 125 illustrated in FIGS. 1 and 2, formed on the optical component 120. FIG. 3 illustrates one embodiment of a reference mark system 300, wherein at least two reference marks 310, 320, are placed on the outer surface of the optical component 120. The two reference marks 310, 320, can provide information regarding a lateral location (y-direction) of the point of emergence of the laser beam 210, or a degree of rotation between the optical component 120 and the optical element 130 to be aligned with the optical component 120.

Using a line through the two reference marks 310, 320, as one plane and the front facet of the optical component 120 as another plane, the robotic system 140 illustrated in FIG. 1 may back calculate determining the far field coupling point in the y-direction. A third reference mark, in line with one of the other two reference marks 310, 320, could also be used to create a second plane, similar to the plane created by the front facet of the optical component 120. Generally, the plane formed by the two reference marks 310, 320, is parallel with a laser stripe 330 of the optical component 120, wherein the laser stripe 330 is parallel with the emerging laser beam 210. By positioning the front face of the optical element 130 and the plane formed by the two reference marks 310, 320, perpendicular to one another, the exiting laser beam 210 and the optical element 130 are substantially aligned. As mentioned above, however, one may only determine where the laser stripe 330 is, thus placing the two reference marks 310, 320, parallel thereto, if a dual output laser chip is being used.

Turning to FIG. 4, illustrated is another embodiment of a reference mark system 400, wherein at least one reference mark 410 in the reference mark system 400 includes a series of bits formed therein, representing a bit pattern. In the embodiment shown in FIG. 4, the reference mark system 400 includes four bit patterns 420, 430, 440, 450, formed in the shape of a cross. The robotic system 140, as disclosed above, could use the cross for alignment, and use the bit patterns 420, 430, 440, 450, for other important information. For example, information such as coupling distance, thickness of the optical component 120, power asymmetry, length of the optical component 120, and other relevant information, may be encoded in the bit patterns 420, 430, 440, 450. It should be understood that the number of bits, number of bit patterns and even their shape may vary depending on an amount of information desired. As discussed above, the bit patterns may be formed by a number of processes, such as etching the bit patterns with a laser, by a chemical etching process, or other physical ablation process, such as a focused ion beam process. It should further be noted that many other techniques may be used to form the bit patterns, including an ink print technique, similar to an ink jet computer printer technology. Moreover, one who is skilled in the art will understand how to code the bit patterns with the desired information.

As an example, the bit pattern 420 could represent the power asymmetry associated with the given optical component, and every counted bit in the bit pattern 420 could represent a scale of power, for example 0.1 mW of power. The number of bits within the bit pattern 420 would then be multiplied by the scale of power, resulting in the power asymmetry for the given optical component. The same effect may also be achieved using the other bit patterns 430, 440, 450, containing other encoded information. In an exemplary embodiment of the invention, a lookup table could be provided to the robotic system 140 explaining how to count the bits, and the scale associated with each bit, within the different bit patterns 420, 430, 440, 450. In the embodiment shown in FIG. 4, each bit pattern 420, 430, 440, 450, includes eight bits representing 256 various solutions. In an exemplary embodiment, the number of bits could be increased within each bit patterns 420, 430, 440, 450, to reach an infinite number of solutions. Increasing the number of possible solutions, theoretically increases the precision of the information encoded within the reference mark 410. Likewise, the number of bit patterns could be increased to make the cross look more like an asterisk, or other common bar code patterns.

As a result of the marking system 125, the present invention, in contrast to the prior art devices, allows for automated assembly in an optical package without having to power the optical component during mounting. Moreover, since the far field coupling point, degree of rotation between a front face of the optical component 120 and the exiting laser beam 210, power asymmetry, thickness (x-direction) of the optical component 120, and length (z-direction) of the optical component 120, may be encoded within the optical component 120, the automated assembly of the optical component within an optical package may be accomplished quickly, without wasting time and money. The present invention may also be applied to photodetectors and modulators. In such a situation, a current source could be replaced with a light source, such as a laser, as the excitation.

Although the present invention has been described in detail, those skilled in the art should understand that they can make various changes, substitutions and alterations herein without departing from the spirit and scope of the invention in its broadest form.

What is claimed is:

1. An optical device, comprising:
    an optical component; and
    a reference mark system located on an outer surface of the optical component, the reference mark system providing information regarding a location of an optical path of the optical component wherein the optical path is coincidental with a near field output of the optical component.

2. The optical device as recited in claim 1 wherein the optical component is a laser chip and the reference mark system provides information regarding a point of emergence of a laser beam from the laser chip.

3. The optical device as recited in claim 2 wherein the reference mark system comprises at least two reference marks from which a far field coupling point of the point of emergence can be determined.

4. The optical device as recited in claim 1 wherein the reference mark system comprises at least two reference marks from which a focal length of the optical path can be determined.

5. The optical device as recited in claim 1 wherein the information regarding the location of the optical path is a lateral location along an emergence side of the optical component or is a degree of rotation between the optical component and an optical element to be aligned with the optical component.

6. The optical device as recited in claim 1 wherein the reference mark system includes a bit pattern including encoded information.

7. The optical device as recited in claim 6 wherein the encoded information is a coupling distance, a thickness of the optical component, power asymmetry, or a length of the optical component.

8. The optical device as recited in claim 1 further including an optical element wherein the optical element is an optical fiber, lens or detector.

9. A method of manufacturing an optical device, comprising:
    forming an optical component; and
    forming a reference mark system on an outer surface of the optical component, the reference mark system providing information regarding a location of an optical path of the optical component wherein the optical path is coincidental with a near field output of the optical component.

10. The method as recited in claim 10 wherein forming an optical component includes forming a laser chip, wherein the reference mark system provides information regarding a point of emergence of a laser beam from the laser chip.

11. The method as recited in claim 11 wherein forming includes forming at least two reference marks from which a far field coupling point of the point of emergence can be determined.

12. The method as recited in claim 10 further including aligning an optical element with the optical path using the reference mark system.

13. The method as recited in claim 10 wherein forming includes forming at least two reference marks from which a focal length of the optical path can be determined.

14. The method as recited in claim 10 wherein the information regarding the location of the optical path is a lateral location along an emergence side of the optical component or is a degree of rotation between the optical component and an optical element to be aligned with the optical component.

15. The method as recited in claim 10 wherein forming a reference mark system includes forming a reference mark system that includes a bit pattern comprising encoded information.

16. The method as recited in claim 16 wherein forming a reference mark system that includes a bit pattern comprising encoded information includes forming a reference mark system that includes a bit pattern comprising encoded information regarding a coupling distance, a thickness of the optical component, power asymmetry, or a length of the optical component.

17. The method as recited in claim 10 wherein forming a reference mark system includes etching an alignment mark using a laser or marking an alignment mark using ink printing technique.

18. The method as recited in claim 10 wherein forming a reference mark system on the optical component includes determining a far field coupling point using a sweeping detector or camera and subsequently forming the reference mark system on the optical component in view of the far field coupling point.

* * * * *